(12) United States Patent
Kurby et al.

(10) Patent No.: US 6,323,804 B1
(45) Date of Patent: Nov. 27, 2001

(54) METHOD AND APPARATUS FOR GPS TIME DETERMINATION

(75) Inventors: Christopher N. Kurby, Elmhurst; Michael D. Kotzin, Buffalo Grove; Daniel T. Buhmann, Hainesville, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/587,866

(22) Filed: Jun. 6, 2000

(51) Int. Cl.$^7$ .............................. G01S 5/00; G01S 13/00; H04B 7/00; H04B 11/00; H04B 15/00
(52) U.S. Cl. .............................. 342/357.06; 342/357.09; 342/357.01; 342/357.08; 342/104; 342/115; 342/50; 342/46; 342/457; 342/357; 342/352; 342/354; 342/357.12; 700/200-215; 370/330; 370/316; 370/337; 370/344; 370/478; 370/480; 375/347; 375/436; 375/202; 375/299; 455/456; 455/446
(58) Field of Search .......................... 342/357.09, 357.01, 342/357.08, 357.06, 104, 115, 50, 46, 457, 357, 352, 354, 357.12; 701/200–215; 455/456, 12.1, 13.4, 428, 446, 62, 63; 370/330, 316, 337, 344, 478, 480; 375/347, 436, 202, 299; 340/982, 989

(56) References Cited

U.S. PATENT DOCUMENTS

| | | | |
|---|---|---|---|
| 5,420,592 | * 5/1995 | Johnson | 342/357 |
| 5,463,400 | * 10/1995 | Tayloe | 342/352 |
| 5,644,572 | * 7/1997 | Olds et al. | 370/324 |
| 5,663,734 | 9/1997 | Krasner | 342/357 |
| 5,752,218 | * 5/1998 | Harrison et al. | 701/207 |
| 5,781,539 | * 7/1998 | Tanaka | 370/312 |
| 5,841,766 | * 11/1998 | Dent et al. | 370/321 |
| 5,862,479 | * 1/1999 | Curter, Jr. et al. | 455/428 |
| 5,889,492 | * 3/1999 | Kurby et al. | 342/357 |
| 5,898,680 | * 4/1999 | Johnstone et al. | 370/316 |
| 5,995,039 | * 11/1999 | Jensen et al. | 342/104 |
| 6,011,786 | * 1/2000 | Dent | 370/330 |
| 6,072,986 | * 6/2000 | Blanchard et al. | 455/13.4 |
| 6,104,978 | * 8/2000 | Harrison et al. | 701/207 |
| 6,114,990 | * 9/2000 | Bergljung et al. | 342/357.09 |
| 6,169,957 | * 1/2001 | Arethens | 701/213 |
| 6,195,040 | * 2/2001 | Arethens | 342/357.12 |

\* cited by examiner

*Primary Examiner*—William A. Cuchlinski, Jr.
*Assistant Examiner*—Ronnie Mancho
(74) *Attorney, Agent, or Firm*—Daniel R. Collopy

(57) ABSTRACT

A system for rapidly acquiring a time reference for the location determination of a wireless communication device. The system includes a wireless communication device (200), a GPS satellite (202) and a communication satellite (208). The method comprises the steps of acquiring a communication satellite signal (210) and using the finite frame time to establish a course time reference. Once the course time reference is established, an absolute device time is determined by the wireless communication device, which as a result is synchronized to the absolute time of the communication satellite (208) to within ten milliseconds. The absolute device time is then used to synchronize the GPS portion of the wireless communication device with the GPS satellite system.

19 Claims, 5 Drawing Sheets

METHOD AND APPARATUS FOR GPS TIME DETERMINATION

BACKGROUND OF THE INVENTION

The present invention relates generally to a method and apparatus for determining a time reference in a cellular communication system. More particularly the present invention relates to expeditiously synchronizing a Global Positioning System (GPS) receiver with its associated GPS satellites and as a result decreasing the device location acquisition rate.

Traditionally, wireless communication devices have functioned solely as a communication device. However, in light of emergency situations and the increased need for location based services in general, the need to accurately locate the subscriber unit (SU) within a given geographical area has become a necessity. Calls originating from a SU under an emergency context can cause a problem for the dispatcher, as the individual using the SU often does not know his exact location. This can have a substantial effect on the time it takes emergency personnel to reach the distressed individual and in life and death situations, time may make a substantial difference. Other location based services, although not as critical as in emergency dispatch, can benefit from the capability to accurately locate the SU.

It is desirable to obtain and communicate physical locations of wireless communication devices within a system, such as radiotelephone handsets within a cellular communication system. In addition, the United States Federal Communications Commission (FCC) has required that cellular communication handsets must be geographically locatable by the year 2001. This capability is desirable for emergency systems such as Enhanced 911 (E911). The FCC requires stringent accuracy and availability performance objectives and demands that cellular communication handsets be locatable within 100 meters 67% of the time for network based solutions and within 50 meters 67% of the time for handset based solutions.

Current generations of cellular communication devices have only limited SU location determination capability. In one technique, the position of the SU is determined by monitoring SU transmissions at several base stations. From time of arrival measurements, the SU's position can be calculated. However, the precision of this technique is limited and, at times, may be insufficient to meet FCC requirements.

Another method and apparatus for determining the location of a SU is to incorporate a Global Positioning System (GPS) receiver into the SU. The GPS receiver is capable of receiving signals from a GPS satellite constellation in a high earth orbit. The GPS receiver is coupled to the microprocessor of the SU and provides location data thereto. This location data may then be transmitted over the cellular communication system from the SU to a base station and then further onto the emergency service requesting the information.

Location determination for GPS is based on triangulation calculations measuring the distance the signal travels from the GPS satellite to the GPS receiver. This method requires the GPS receiver in the SU to have the same time reference as the GPS satellite sending the signal. The signal sent by the GPS satellite includes its time reference along with other information including satellite ephemeris information. Having the same time reference allows the SU to determine how long the signal traveled in time from the GPS satellite to the GPS receiver. Since the signal travels at the speed of light, the distance traveled can be calculated knowing the time it took the signal to reach the SU. However, the SU must initially have a absolute device time in order to rapidly synchronize with the GPS system. This is exacerbated with infrastructure aided GPS systems which use a one second integration time. The absolute device time must be within 10 milliseconds for the GPS calculations to be effective in determining the device location. Acquisition based on time reference acquisition can take an extensive amount of time as the receiver must search all possible code phases. This is because there are multiple satellites sending data at the same time, which are constantly moving at a high rate of speed, in addition to atmospheric aberrations that disrupt the signal as it travels from the satellite down to the SU. This acquisition time may be in terms of minutes to establish the location of the device. In an emergency situation, this time to acquire the time reference and subsequently the location information is unacceptable as it leads to large delays in dispatching the appropriate help and in life and death situations this time may be critical.

Finally, the Iridium™ satellite communication system has the capability to locate a SU to within 10 kilometers using a passive geo method for determining the SU location without a GPS receiver. This system too, is clearly unacceptable in terms of accuracy required for the location based services.

Accordingly, a system is needed to improve the time to determine the location of a SU. This is the case not only for emergency situations but for location based services which can improve service with the capability to receive expedited and accurate location information.

DETAILED DESCRIPTION OF THE PREFERRED EMBODIMENTS

An improved system and method is described for establishing a time reference in a wireless communication device. The system comprises the novel integration of a GPS receiver and a communication satellite receiver into a wireless communication device to rapidly acquire a time reference used by the GPS system to determine the device location. Acquiring an accurate geographical position in a very short time is desirable for Location Based Services (LBS) and essential for Enhanced 911 (E911) systems in order for these systems to be effective.

Figure 1:
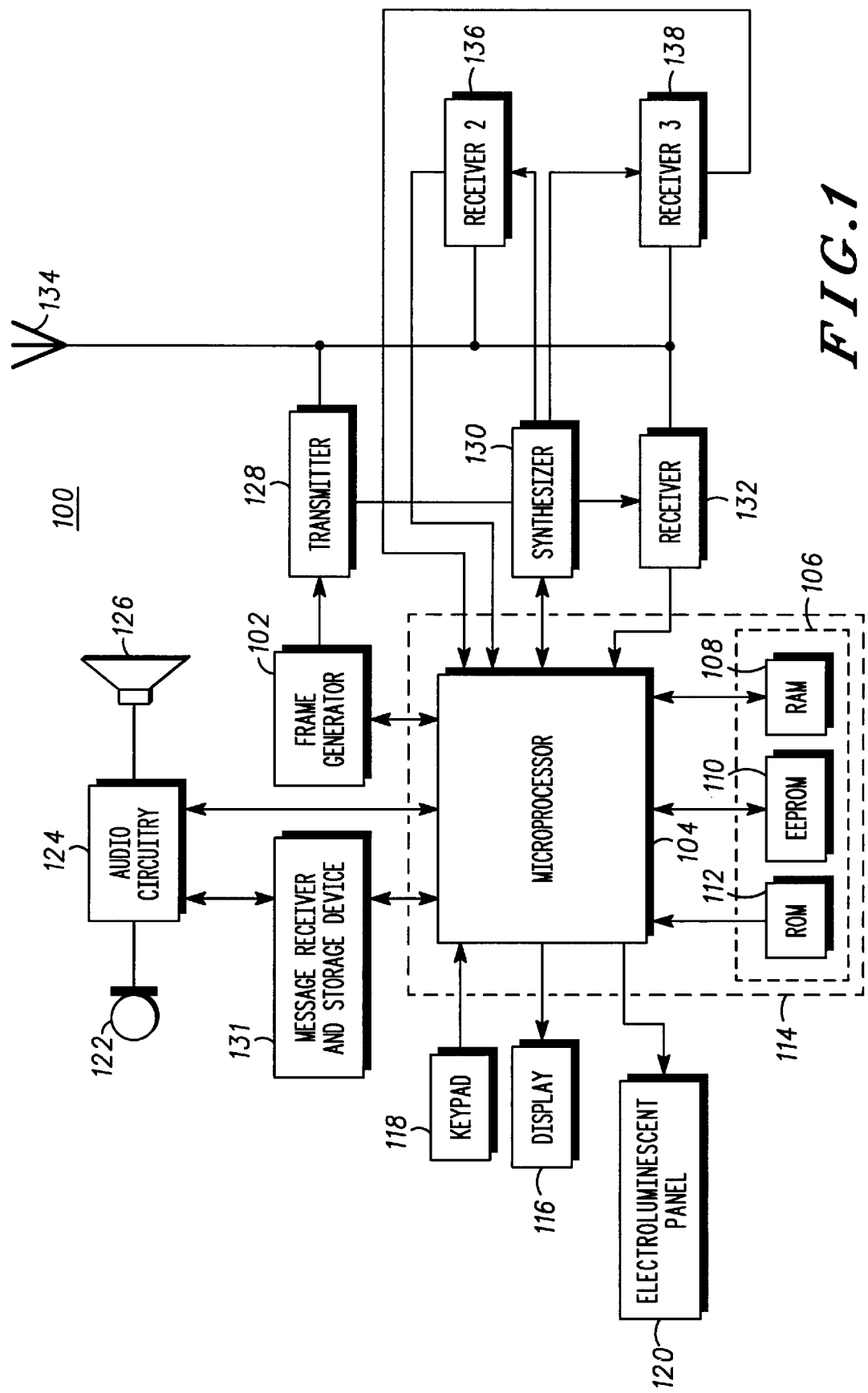
FIG. 1 is a block diagram of a cellular radiotelephone system in accordance with the preferred embodiment.

Turning to FIG. 1, a block diagram of a wireless communication device and more particularly a cellular radiotelephone system in accordance with the preferred embodiment is shown. In addition to typical components of a cellular radiotelephone, the communication device includes a first receiver 136 and a second receiver 138. In the preferred embodiment of the present invention, the first receiver 136 is for receiving satellite communication signals and the second satellite receiver 138 is for receiving GPS signals. A multiband antenna 134 is coupled to the first receiver 136, the second receiver 138 and a wireless communication device receiver 132.

In the preferred embodiment a frame generator ASIC 102, such as a CMOS ASIC available from Motorola, Inc. and a microprocessor 104, such as a 68HC11 microprocessor also available from Motorola, Inc., combine to generate the necessary communication protocol for operating in a cellular system. Microprocessor 104 uses memory 106 comprising RAM 108, EEPROM 110, and ROM 112, preferably consolidated in one package 114, to execute the steps necessary to generate the protocol and to perform other functions for the wireless communication device, such as writing to a display 116, accepting information from a keypad 118, or controlling a frequency synthesizer 130 and controlling a cellular communication receiver 132, a first satellite receiver 136 for receiving GPS signals, and a second satellite receiver 138 for receiving satellite communication signals. ASIC 104 processes audio transformed by audio circuitry 124 from a microphone 122 and to a speaker 126.

In the preferred embodiment of the present invention, a wireless communication device operates in a cellular radiotelephone communication system. This system serves the general public by providing wireless communication between multiple users geographically separated. In the present invention, the cellular system may utilize current second generation (2G) cellular systems using one or more of the following technologies: CDMA, TDMA, GSM, or iden, or a third generation (3G) system incorporating cdma2000 or WCDMA or the like. In the preferred embodiment of the present invention the SU transmits voice communications and positional information over a 2G cellular communication system. The positional information received at the base station (BS) can then be processed by the BS and directed to the appropriate source.

Figure 2:
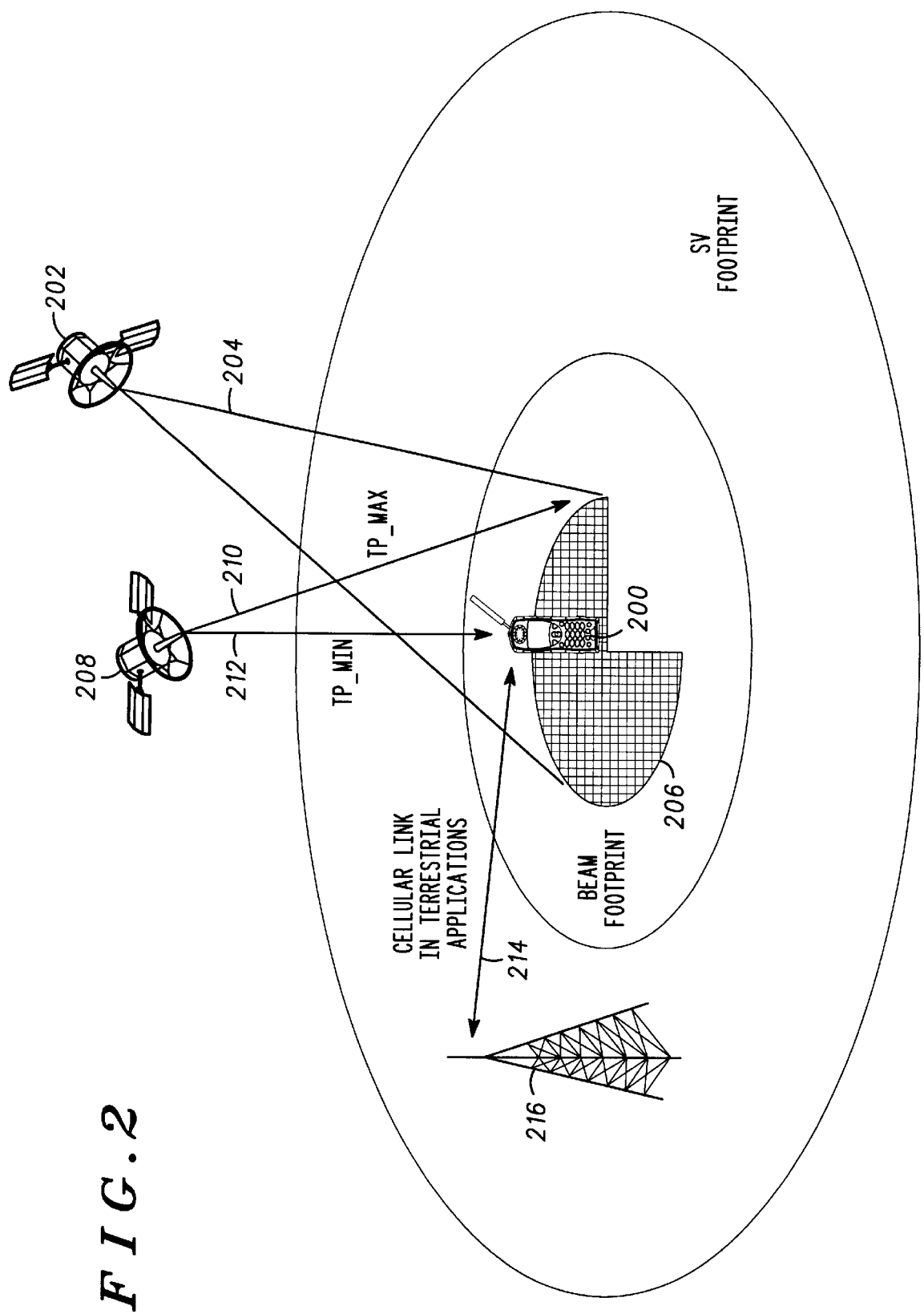
FIG. 2 is a satellite beam footprint in accordance with the preferred embodiment.
Figure 5:
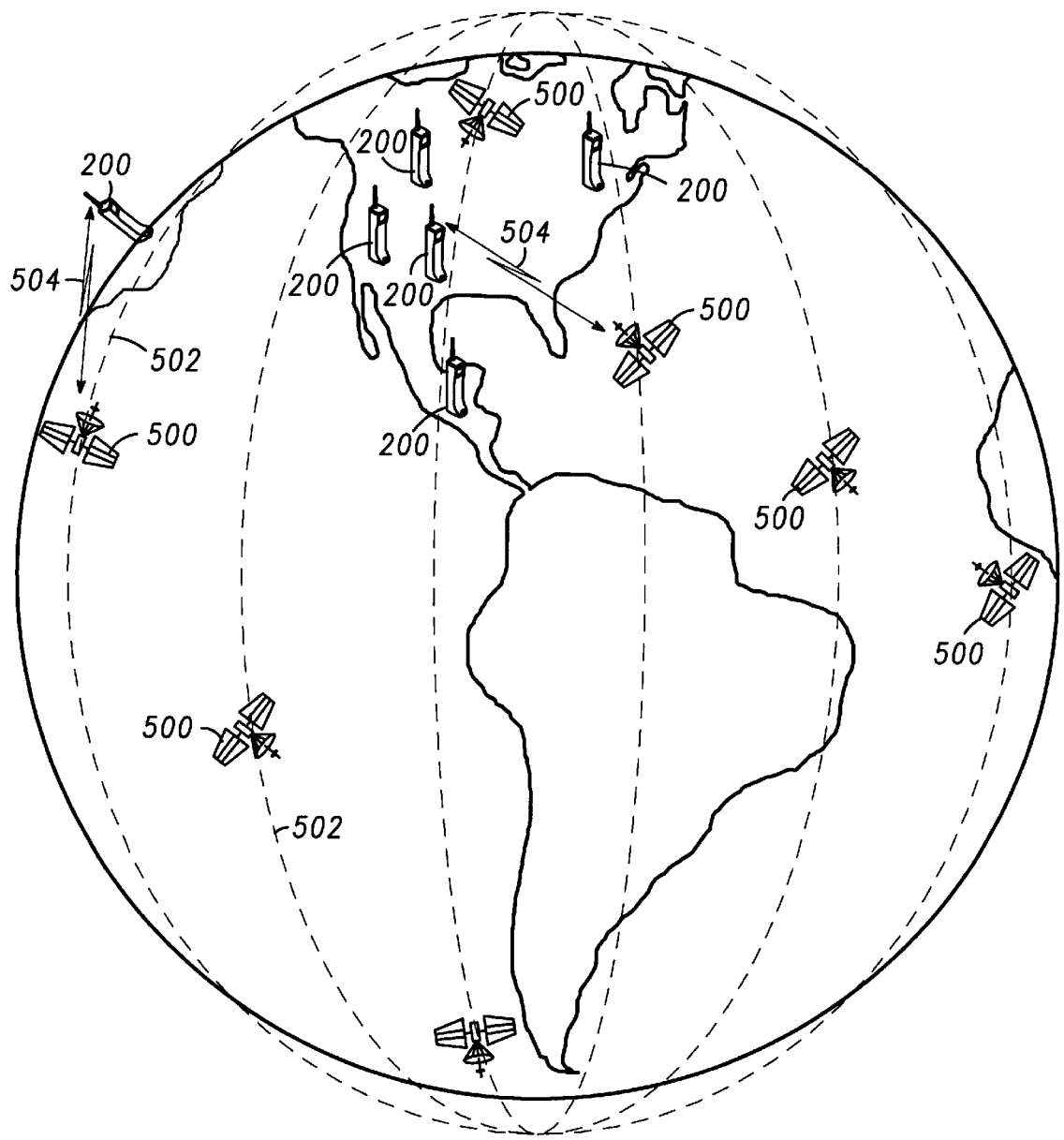
FIG. 5 is a representation of a satellite constellation in accordance with the preferred embodiment.

A pictorial representation of the wireless communication system of the preferred embodiment of the present invention is shown in FIG. 2. The overall system incorporates a wireless communication device 200, a GPS satellite 202, a communication satellite 208 and a wireless communication system base station 216. The GPS receiver incorporated into the wireless communication device is attuned to receive Navastar GPS radio frequency (RF) signals at 1575 Mhz. The plurality of satellites that make up the GPS system are referred to as a constellation as shown in FIG. 5. The GPS satellite 202, representing one in the GPS constellation, transmits GPS data necessary to the operation of the GPS system. The GPS data transmitted includes at least a satellite time reference and ephemeris data giving satellite positional information specific to the individual satellite. This data is used in accordance with the operation of the GPS system to allow the SU 200 to triangulate the position thereof. Efficient operation of the GPS system requires that the time ambiguity between the absolute satellite time and the absolute device time be less than 10 milliseconds. This allows the GPS satellites to be rapidly acquired.

The communication satellite receiver, also shown in FIG. 2 is for receiving communication signals from a satellite communication system, such as the Globalstar™ or Teledesic™ satellite communication systems. The communication satellite may also include a plurality of satellites in their own respective constellation. Each satellite, within the satellite constellation has at least one transmission signal directed to the earth forming a highly predictable reception zone on the earth's surface. The signal contains communication information as well as an absolute time reference used to synchronize the digital communication information.

The communication satellite signal propagation path forms a beam as it travels from the satellite to the earth thereby forming an area on the earth. Each satellite transmits at least one RF beam, each RF beam having the capability to communicate with multiple users simultaneously. The RF beam has an RF beam center and the geographical coordinates of the RF beam center are known. As the RF beam center travels across the earth's surface, the coordinates of the RF beam center are transmitted within the communication satellite signal. The device on the receiving end can receive this data allowing the device to determine which beam center is closest for best reception.

If the wireless communication device is within a 300 km distance of its last known location, the device will select a best beam center by the last known GPS location stored. The time ambiguity as a result will be within +/−1.1 milliseconds because the location can be used to calculate the signal propagation time delay using the communication satellites known latitude and longitude transmitted in the communication satellite data signal. If the SU finds the beam center within 300 km, of the last known location, the SU will use this positional information to prime the GPS search. If a beam center is not found within 300 km of the last known position, the beam center with the highest power will be used to prime the GPS search. Selecting the best beam center by the highest power may take an average of eight seconds, whereas selection is immediate if the is a beam center is located within 300 km of the last known location.

Figure 3:
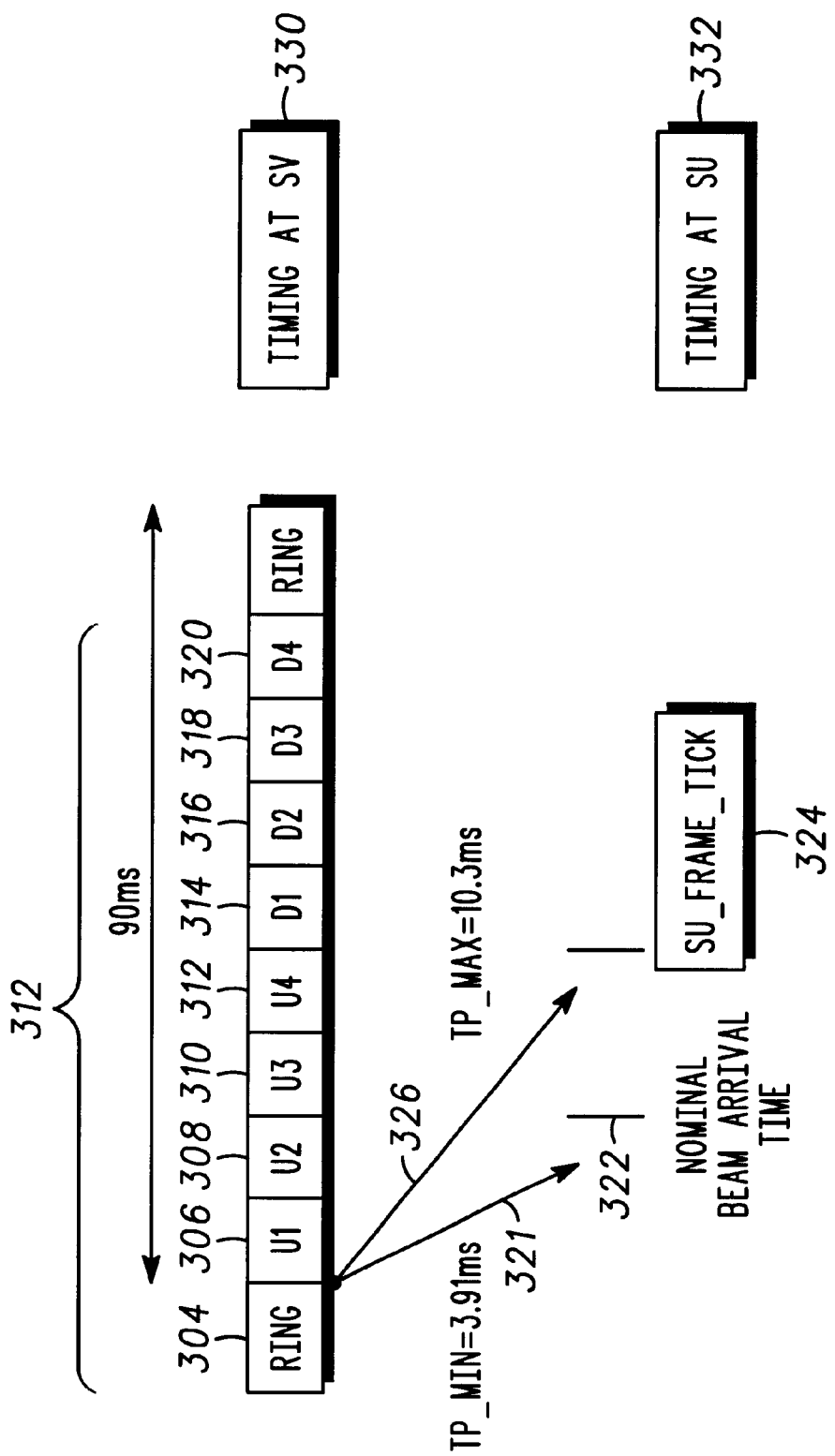
FIG. 3 is a representation of the data stream showing the low orbit satellite data frames in accordance with the preferred embodiment.

The satellite communication data signal 210, transmitted by the satellite communication satellite 208, is transmitted at a power relatively greater than GPS transmission power, allowing faster acquisition of the satellite communication data signal by the communication satellite receiver of the wireless communication device. Once the communication satellite beam has been selected, the SU will read the frame time. The satellite communication data signal 210 is shown in FIG. 3. The frame time is broadcast every 540 milliseconds in the preferred embodiment of the present invention allowing the SU to determine absolute time to within plus or minus the propagation time error. Within each time frame are time slots U1-4, and D1-4, 306–320. The beginning of each time frame is distinguished by a ring slot 304. This is a unique slot containing the latitude and longitude of the communication satellite. This information allows synchronization of the SU with the satellite by identifying each frame symbol as the start of each frame. In the case of the preferred embodiment of the present invention the time ambiguity will be at most +/−3.2 milliseconds. Either method of selecting the satellite and respective signal allows for a time ambiguity of less than 10 milliseconds as required for the GPS to determine position within the accuracy requirements.

The wireless communication device, when turned on or after losing the signal for an extended period of time, will begin an acquisition cycle to expeditiously acquire a GPS satellite signal and time reference data therefrom in order to provide the time reference data to the GPS system. Simultaneously, the satellite communication receiver will search for a satellite communication signal from which a time reference may also be obtained. The satellite communication signals are generally stronger than a GPS signal allowing faster acquisition of the satellite communication signal and retrieval of time reference data. The flow chart in FIG. 4 shows the steps involved in rapid infrastructure aided acquisition of the time reference data and the further establishment of an absolute device time which is synchronized with the absolute satellite time in the satellite communication system and the GPS satellite which are both maintained by an atomic clock in each individual satellite within each satellite system.

Figure 4:
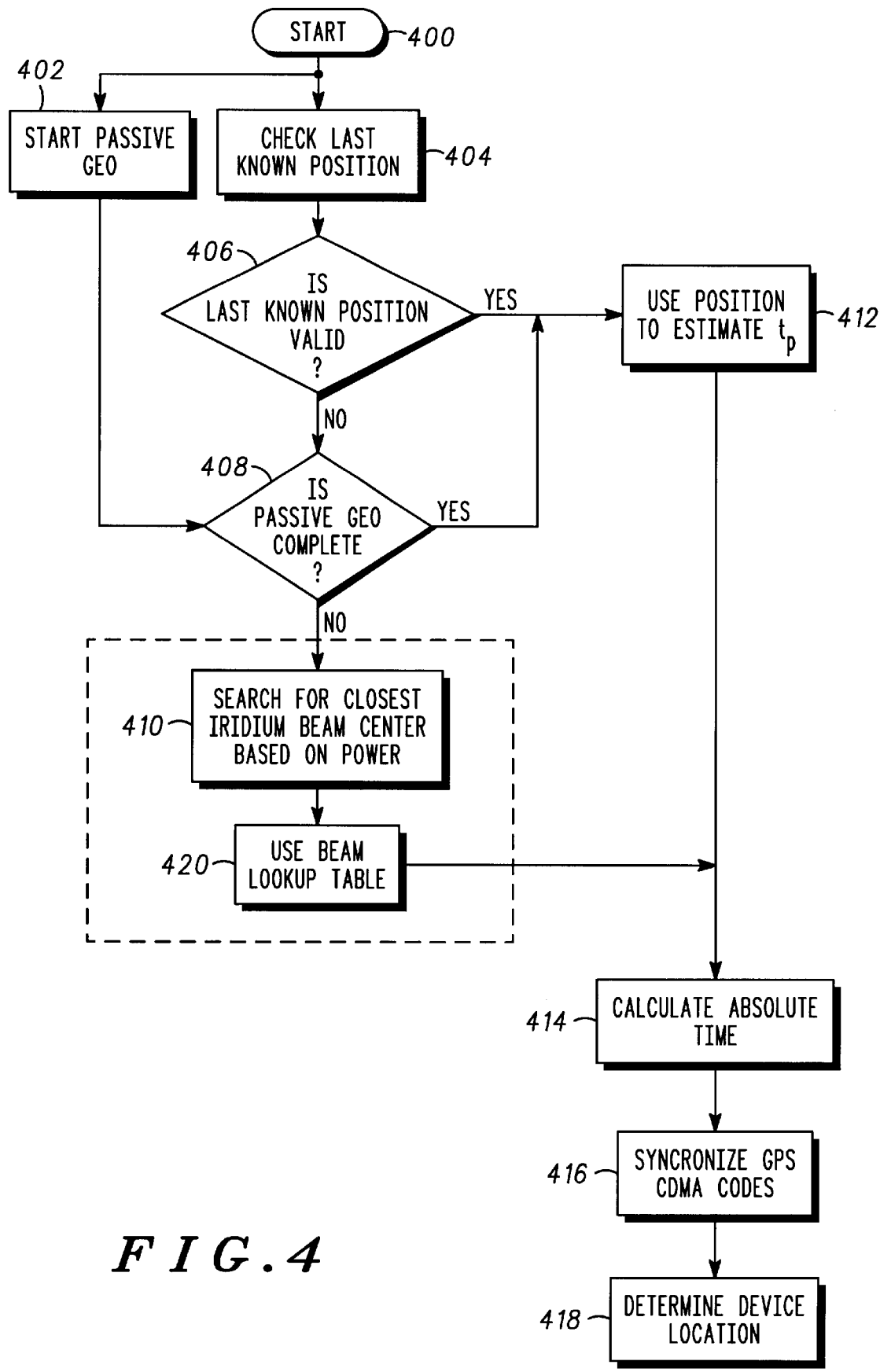
FIG. 4 is a flow chart showing the acquisition of the time reference from the low orbit satellite in accordance with the preferred embodiment.

Step 400 in FIG. 4 begins the process and signifies when the wireless communication device is turned on or when the GPS synchronization is lost due to signal fading or other disruptions. The device will begin to start a passive geo search 402 and simultaneously compare the last known position 404 with the closest current beam center from the satellite communication system. The passive geo search 402 may take between nine seconds to forty five minutes. This large variation in signal acquisition time drives the need for infrastructure aided GPS, which reduces this signal acquisition time substantially. If the passive geo search 402 completes its acquisition of at least three satellite positions prior to the last know position comparison 406 step, then the last known position comparison 406 step is terminated and the system moves to step 412. If the passive geo acquisition 408 is not complete then the device will search for the closest satellite communication beam center based on power 410. Once the closest beam center is located the wireless communication device will extract the beam lookup table from the communication satellite signal. The beam lookup table includes an estimated propagation error $t_p$ associated with that satellite.

In step 412 the wireless device will use the satellite ephemeris data to estimate the signal propagation time $t_p$ corresponding to at least three satellites. Next, in step 414 the SU 200 calculates, the absolute device time from the position estimate or last known position and the communication satellite ephemeris data. Once the SU 200 has calculated the absolute device time 414 and rough location rapidly, the GPS can synchronize the code division multiple access (CDMA) pseudo noise codes and establish links with at least three GPS satellites. Once the GPS portion of the communication device has linked with at least three GPS satellites. The location of the SU 200 can be determined through the techniques used in the GPS system.

In an alternative embodiment of the present invention, the wireless communication device will transmit GPS data collected thereby over a communication system, such as a cellular communication system, to a base station (BS). The BS will use the GPS data to calculate the position of the device. The method may be utilized when the subscriber unit is limited in space and weight and therefore can not make the necessary positional calculations. The base station on the other hand is not as limited by space or weight and retains the necessary microprocessor and related system architecture to make the positional calculations. The base station may track a plurality of SU in the field and will therefore have the positional data in a common location which makes access to the information unencumbered. This will allow for fast calculations involving data from multiple SU's efficient and achievable.

While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. A portable communication device comprising:
   a first satellite receiver for receiving a first satellite signal, said first satellite signal, in the form of a beam having a beam center, includes a first satellite data stream, formatted into finite time frames sequentially transmitted, said finite time frames include an absolute satellite time and a frame time associated with said absolute satellite time, a first satellite ephemeris data, and beam center data;
   a microprocessor coupled to said first satellite receiver for extracting said absolute satellite time from said first satellite data stream to generate a absolute device time that is synchronized with said absolute satellite time,
   wherein said absolute satellite time and said absolute device time have a time reference ambiguity associated therewith; and
   a Global Positioning System (GPS) receiver coupled to said microprocessor for receiving said absolute device time from said microprocessor and using said absolute device time to synchronize said GPS receiver with at least three GPS satellites and further calculating a location therefrom.

2. The device as in claim 1 wherein said first satellite frame time is broadcast by said first satellite at least every 540 milliseconds.

3. The device as in claim 1 wherein said microprocessor selects a first satellite signal from a plurality of first satellite signals by determining the relative strength of each individual first satellite signal and selecting the first satellite signal with the highest power level.

4. The device as in claim 1 wherein said microprocessor uses said frame time as a course time reference in the GPS system.

5. The device as in claim 1 wherein said first satellite receiver selects a first satellite signal based on the last known position of said device.

6. The device as in claim 4 wherein the time reference ambiguity between said absolute satellite time and said absolute device time is no more than 10 milliseconds.

7. The device as in claim 1 further comprising a portable communication transmitter, said communication transmitter for transmitting said GPS location to a communication system base station,
   wherein said communication system base station calculates a precise location of said portable communication device using said absolute satellite time.

8. A method for determining the position of a communication device, said method comprising:
   acquiring a first satellite signal with a first satellite receiver, said first satellite signal having a first satellite frame time data, an absolute satellite time, and a satellite beam center;
   extracting said first satellite frame time data from said first satellite signal;
   calculating an absolute device time based on said first satellite frame time data and a propagation time estimate;
   synchronizing a GPS receiver using said absolute device time data;
   determining a precise location of said communication device with said GPS; and
   transmitting said precise location from a portable communication transmitter portion of said device.

9. The method as in claim 6 wherein said first satellite receiver selects a first satellite signal by selecting from a plurality of first satellite signals, the signal with the highest relative signal level,
   wherein the absolute time error of said first satellite signal is less than 3.2 milliseconds.

10. The method as in claim 6 wherein said first satellite receiver selects a first satellite signal based on the last known position of said device, wherein the absolute time error of said first satellite signal is less than 1.1 milliseconds.

11. A portable communication device comprising:

a satellite receiver for receiving a satellite signal, said satellite signal includes satellite data, formatted into finite time frames sequentially transmitted, said finite time frames include an absolute satellite time and a frame time associated with said absolute satellite time; and a microprocessor coupled to said satellite receiver for extracting said absolute satellite time from said satellite data to generate a device absolute time that is synchronized with said absolute satellite time.

12. The device as in claim 11 further comprising a Global Positioning System (GPS) receiver coupled to said microprocessor for receiving said absolute device time from said microprocessor for synchronizing to said GPS, and calculating location information therefrom.

13. The device as in claim 11 wherein said satellite frame time is broadcast by said satellite at least every 540 milliseconds.

14. The device as in claim 11 wherein said cellular transmitter receives said location information and transmits said location information to a cellular base station.

15. The device as in claim 11 wherein said satellite receiver of said wireless communication device selects a satellite signal from a plurality of satellite signals by determining the relative strength of each individual satellite signal and selecting the satellite signal with the highest power level, and wherein said satellite receiver further determines a course location estimate.

16. The device as in claim 11 wherein said satellite receiver selects an satellite signal based on the last known position of said device, and wherein said satellite receiver determines a course location estimate.

17. The device as in claim 13 wherein the absolute time error of said first satellite communication system signal is at most 3.2 milliseconds.

18. The device as in claim 14 wherein the absolute time error of said first satellite communication signal is at most 1.1 milliseconds.

19. The device as in claim 11 wherein said satellite receiver determines a course location estimate using a passive geo method.

* * * * *